(12) United States Patent
Wang et al.

(10) Patent No.: US 11,256,940 B1
(45) Date of Patent: Feb. 22, 2022

(54) METHOD, APPARATUS AND SYSTEM FOR GRADIENT UPDATING OF IMAGE PROCESSING MODEL

(71) Applicant: Shenzhen Intellifusion Technologies Co., Ltd., Guangdong (CN)

(72) Inventors: Heguo Wang, Guangdong (CN); Wen Jiang, Guangdong (CN)

(73) Assignee: Shenzhen Intellifusion Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/471,169

(22) Filed: Sep. 10, 2021

(30) Foreign Application Priority Data

Sep. 30, 2020 (CN) .......................... 202011064730.X

(51) Int. Cl.
*G06K 9/00* (2006.01)
*G06K 9/62* (2006.01)
*G06T 1/60* (2006.01)
*G06F 13/28* (2006.01)

(52) U.S. Cl.
CPC ......... *G06K 9/00986* (2013.01); *G06F 13/28* (2013.01); *G06K 9/6217* (2013.01); *G06T 1/60* (2013.01)

(58) Field of Classification Search
CPC .. G06K 9/00986; G06K 9/6217; G06F 13/28; G06T 1/60
See application file for complete search history.

(56) References Cited

U.S. PATENT DOCUMENTS

2019/0354811 A1* 11/2019 Hu .................... G06K 9/6262
2020/0311531 A1* 10/2020 Liu ..................... G06N 3/04

* cited by examiner

*Primary Examiner* — Jianxun Yang

(57) ABSTRACT

The present disclosure is applied for artificial intelligence (AI) technology field and provided a method for gradient updating of an image processing model and a related apparatus thereof. The method includes: determining a convolution kernel and convoluted data corresponding to each convolution layer by invoking a direct memory access (DMA) controlling module, according to convolution parameters of each convolution layer in the image processing model, and storing the convolution kernel and the convoluted data into a first cache space and a second cache space, respectively, the convolution kernel including a convolution kernel for an original image feature gradient and a convolution kernel for an original weight gradient; and performing an inverted convolution calculation based on the convolution kernel in the first cache space and the convoluted data in the second cache space to update the original image feature gradient and the original weight gradient of each convolution layer.

12 Claims, 12 Drawing Sheets

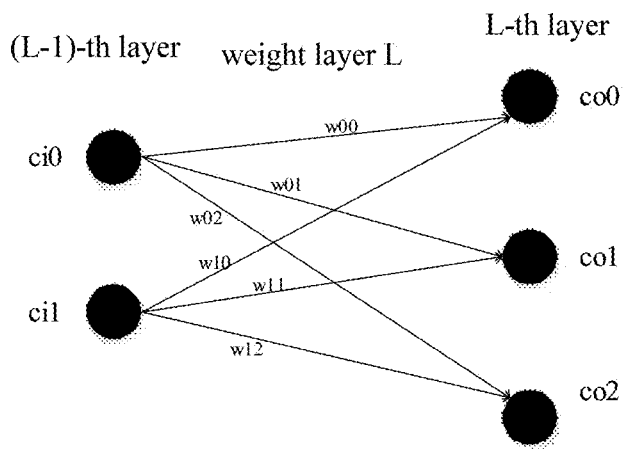

FIG. 1

```
Determining a convolution kernel and convoluted data corresponding to each
convolution layer according to convolution parameters of each convolution layer        ⎯ 210
in the image processing model, by invoking a direct memory access (DMA)
                         controlling module
```

```
Storing the convolution kernel corresponding to each convolution layer into a
first cache space, and storing the convoluted data corresponding to each               ⎯ 220
convolution layer into a second cache space, by invoking the DMA controlling
                                    module
```

```
Performing an reversed convolution calculation based on the convolution kernel
in the first cache space and the convoluted data in the second cache space to          ⎯ 230
update an original feature gradient and an original weight gradient of each
                              convolution layer
```

FIG. 2

1. Reading the first row data and then writing the first row data to the second cache space 2. Reading the second row data and then writing the second row data to the second cache space 3. Reading the third row data and then writing the third row data to the second cache space

FIG. 12

METHOD, APPARATUS AND SYSTEM FOR GRADIENT UPDATING OF IMAGE PROCESSING MODEL

1. TECHNICAL FIELD

The present disclosure generally relates to artificial intelligence (AI) technology fields, and especially relates to a method for gradient updating of an image processing model, an apparatus for gradient updating of an image processing model, and a system for gradient updating of an image processing model.

2. DESCRIPTION OF RELATED ART

Two basic elements of artificial intelligence (AI) are training and inference. A structure of an image processing model which has been designed must be trained by a large amount of data, and then it can be used for inference after reaching a certain precision and accuracy. The more data sets trained, the better performances of the image processing model, and the more intelligent the image processing model will be. At present, a mainstream training method applied for the image processing model is a gradient descent method. However, such gradient descent method is of low gradient updating efficiency, a long training time and high energy consumption.

SUMMARY

The technical problems to be solved: in view of the shortcomings of the related art, the present disclosure relates to a method, an apparatus and a system for gradient updating of an image processing model which can at least solve problems of low efficiency of gradient update, a long training time and high energy consumption of image processing models in the related art.

In a first respect, a method for gradient updating of an image processing model according to an embodiment of the present disclosure includes: determining a convolution kernel and convoluted data corresponding to each convolution layer according to convolution parameters of each convolution layer in the image processing model, by invoking a direct memory access (DMA) controlling module; storing the convolution kernel corresponding to each convolution layer into a first cache space, and storing the convoluted data corresponding to each convolution layer into a second cache space; wherein the convolution parameters comprise an image feature, a weight, an original image feature gradient and an original weight gradient, and the convolution kernel comprises a convolution kernel for the original image feature gradient and a convolution kernel for the original weight gradient; and performing an inverted convolution calculation based on the convolution kernel in the first cache space and the convoluted data in the second cache space to update the original feature gradient and the original weight gradient of each convolution layer.

In a second respect, an apparatus for gradient updating of an image processing model according to an embodiment of the present disclosure includes: a DMA controlling module invocation unit configured to invoke a DMA controlling module and determine a convolution kernel and convoluted data corresponding to each convolution layer according to convolution parameters of each convolution layer in the image processing model, store the convolution kernel corresponding to each convolution layer into a first cache space and the convoluted data corresponding to each convolution layer into a second cache space, respectively; wherein the convolution parameters comprise an image feature, a weight, an original image feature gradient and an original weight gradient, and the convolution kernel comprises a convolution kernel for the original image feature gradient and a convolution kernel for the original weight gradient; and an inverted convolution calculation unit configured to perform an inverted convolution calculation based on the convolution kernel in the first cache space and the convoluted data in the second cache space to update the image original feature gradient and the original weight gradient of each convolution layer.

In a third respect, a system for gradient updating of an image processing model according to an embodiment of the present disclosure includes a first DMA controller configured to determine a convolution kernel corresponding to each convolution layer according to convolution parameters of each convolution layer in the image processing model, and store the convolution kernel corresponding to each convolution layer into a first cache space; a second DMA controller configured to determine convoluted data corresponding to each convolution layer according to the convolution parameters of each convolution layer in the image processing model, and store the convoluted data corresponding to each convolution layer into a second cache space; and a processor configured to perform an inverted convolution calculation based on the convolution kernel in the first cache space and the convoluted data in the second cache space to update an original image feature gradient and an original weight gradient of each convolution layer.

In a fourth respect, a terminal according to an embodiment of the present disclosure includes a memory, a processor and computer programs stored in the memory and performed by the processor to implement steps of the method for gradient updating of the image processing model above mentioned in the first aspect.

In a fifth respect, a computer readable storage medium according to an embodiment of the present disclosure is configured to store computer programs, the computer programs performed by a processor to implement steps of the method for gradient updating of the image processing model above mentioned in the first aspect.

In a sixth respect, a computer program product according to an embodiment of the present disclosure is configured to be performed by a terminal to implement steps of the method for gradient updating of the image processing model above mentioned in the first aspect.

Comparing with the related art, the present disclosure provides the advantages as below.

It can be seen that, in an embodiment of the present disclosure, the processor in the mobile terminal can be configured to invoke the DMA controlling module to pre-determine the convolution kernel and the convoluted data from the convolution parameters of the convolutional network in the image processing model, and then store the convolution kernel and the convoluted data in different cache spaces, respectively. In this way, the processor can be configured to invoke the convolution kernel and a corresponding convoluted data from the cache space to directly perform an inverted convolution calculation, rather than invoking data and determining the convolution kernel from a memory (such as a hard disk). Therefore, the present disclosure can greatly improve gradient update efficiency, save a training cost and shorten a training time of the image processing model, so that the image processing model can be quickly put into an actual image processing service business.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the art, other drawings can be obtained according to the drawings below on the premise of no creative work.

FIG. 1 is a schematic diagram of forward propagation of a neural network convolutional layer.

FIG. 2 is a flowchart of a method for gradient updating of an image processing model in accordance with an embodiment of the present disclosure.

FIG. 12 is a schematic diagram of writing a feature of the (L−1)-th layer shown in FIG. 10 to the second cache space in accordance with an embodiment of the present disclosure.

DETAILED DESCRIPTION

Figure 3:
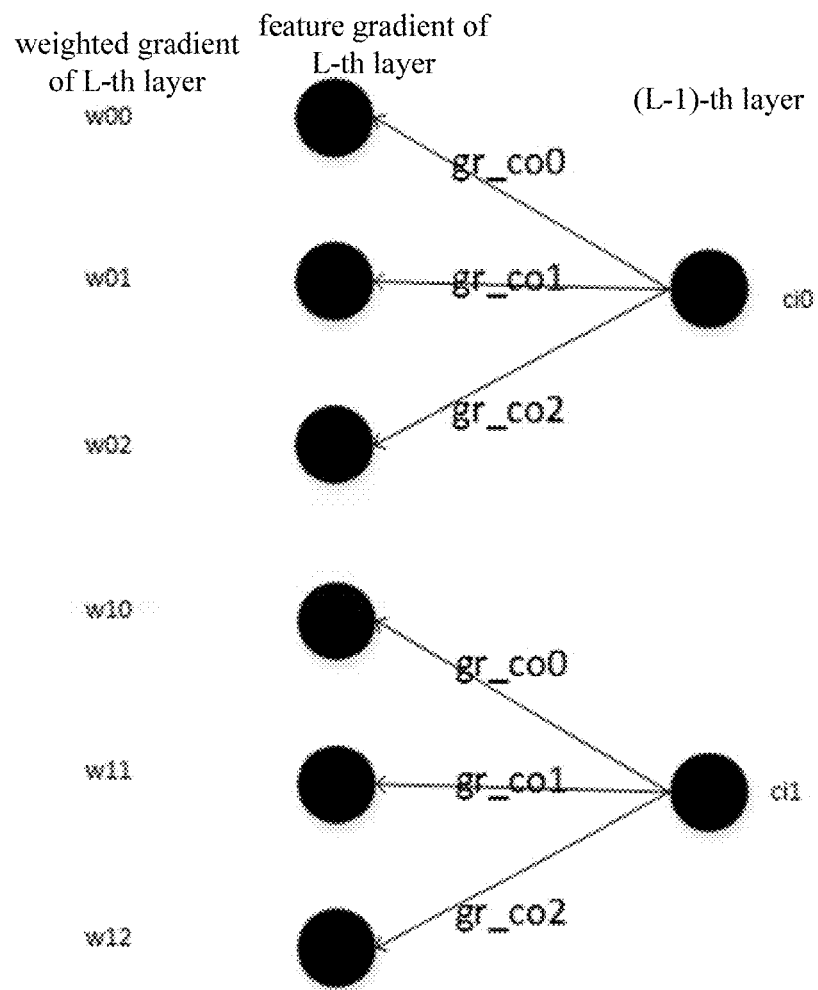
FIG. 3 is a schematic diagram of calculating a weight gradient of an L-th layer of FIG. 1 in a back propagation process of the neural network convolutional layer.

In order to make the purpose, the technical solution and advantages of the present disclosure clearer and clearer, a further detailed description of the present disclosure in combination with the attached drawings and embodiments is provided. It can be understood that specific embodiments described herein are only used to explain, but not limited to the present disclosure.

In the following description, specific details such as structures of a specific system, a technology, etc. are provided for illustration rather than qualification purposes for thoroughly understanding of embodiments of the present disclosure. However, one of ordinary skill in the art should be aware that the present disclosure can be realized in other embodiments without these specific details. In other cases, detailed descriptions of well-known systems, devices, circuits, and methods are omitted so that the description of the present disclosure can't be precluded by unnecessary details.

It can be understood that, when used in the specification and the attached claims, the term "include" is indicated that features, wholes, steps, operations, elements and/or components described exist, without excluding to exist or add one or more other features, wholes, steps, operations, elements, components and/or collections thereof.

It can be also understood that the terms used herein are intended only to describe specific embodiments rather than being intended to limit the present disclosure. As described in the specification and the attached claims, the singular terms "one", "a" and "the" are intended to include the plural, unless the context clearly indicates otherwise.

It should also be further understood that the term "and/or" described in the specification and the attached claims is indicated that any combination and all possible combinations of one or more of the items is listed in relation to each other, and include the combinations thereof.

As described in the specification and the attached claims, the term "if" can be interpreted in context as "when . . . " or "once" or "responding to determine" or "responding to detect". Similarly, the phrases "if determining" or "if detecting [described conditions or events]" can be interpreted depending on contexts to mean "once determining" or "in response to determine" or "once detecting [described conditions or events]" or "in response to detect [described conditions or events]".

For specific implementations, mobile terminals described in the embodiments of the present disclosure include, but are not limited to, other portable devices such as mobile phones, laptops or tablet computers having touch-sensitive surfaces (for example, touch-screen displays and/or touch pads). It should also be understood that, in some embodiments, the above device is not a portable communication device, but a desktop computer with a touch-sensitive surface (for example, a touch-screen display and/or a touch pad).

In the following discussion, mobile terminals including displays and touch-sensitive surfaces are described. However, it should be understood that the mobile terminal can include one or more other physical user interface devices such as a physical keyboard, a mouse, and/or a joystick.

Various applications performed on the mobile terminal can be configured to use at least one common physical user interface device such as a touch-sensitive surface. One or more functions of the touch-sensitive surface and corresponding information displayed on the mobile terminal can be adjusted and/or changed between applications and/or within corresponding applications. In this way, a common physical architecture of the mobile terminal (for example, touch-sensitive surfaces) can support a variety of applications with an intuitive and transparent user interface to a user.

In addition, in the description of the present disclosure, terms "first", "second", etc., are used only to distinguish the description rather than indicating or implicating a relative importance between elements thereof.

FIG. 1 is a schematic diagram of forward propagation of a neural network convolutional layer.

Referring to FIG. 1, an (L−1)-th layer and an L-th layer respectively represent two convolution layers connected with each other. The (L−1)-th layer is an input of the L-th layer, and includes ci0 and ci1, and a convolution output of the L-th layer includes co1, co2 and co3, that is, the input includes two feature vectors and the output includes three feature vectors. Six weights w00, w01, w02, w10, w11 and w12 are included in a full connection network.

It should be noted that back propagation of the neural network convolutional layer is an inverted process of the forward propagation. For example, a feature gradient of the L-th layer is input by calculating a feature gradient of the (L−1)-th layer and a weight gradient of the L-th layer.

FIG. 2 is a flowchart of a method for gradient updating of an image processing model in accordance with an embodiment of the present disclosure. An execution subject of the method can be a variety of mobile terminals or processors, such as a mobile terminal or a processor configured for training the image processing model.

Referring to FIG. 2, step 210, determining a convolution kernel and convoluted data corresponding to each convolution layer according to convolution parameters of each convolution layer in the image processing model by invoking a direct memory access (DMA) controlling module. The convolution parameters can include an image feature, a weight, an original image feature gradient and an original weight gradient. It can be understood that, the image processing model can be applied to all kinds of image processing such as image recognition processing, image super-partition processing, etc., which is not limited here.

The convolution parameters of each convolution layer in the image processing model can be collected that the image processing model has been performed the forward propagation or before performing the back propagation (or a gradient update) on the image processing model.

In addition, the convolution kernel can include a convolution kernel for the original image feature gradient and a convolution kernel for the original weight gradient. Correspondingly, the convolution kernel and the convoluted data required by each convolution layer in a process of inverted convolution calculation (or a gradient update) can be successively screened from the convolution parameters that have been obtained.

Step 220, storing the convolution kernel corresponding to each convolution layer into the first cache space and the convoluted data corresponding to each convolution layer into the second cache space, by invoking the DMA controlling module.

Step 230, performing an inverted convolution calculation based on the convolution kernel in the first cache space and the convoluted data in the second cache space to update the original image feature gradient and the original weight gradient of each convolution layer. Specifically, directly multiplying the convolution kernel in the first cache space and corresponding convoluted data in the second cache space to update a gradient of a corresponding convolution layer.

FIG. 3 is a schematic diagram of calculating a weight gradient of the L-th layer of FIG. 1 in a back propagation process of the neural network convolutional layer.

Referring to FIG. 3, the weight gradient of the L-th layer can be calculated as follows.

$$\nabla_{W^l}L = X^{l-1} \otimes \delta^l \qquad \text{formula (1)}$$

Wherein, $\nabla_{W^l}L$ represents a weight gradient of the L-th layer, $X^{l-1}$ represents a feature of the (L−1)-th layer, $\delta^l$ represents a feature gradient of the L-th layer. The feature gradient of the L-th layer is used as the convolution kernel to perform convolution processing on the feature of the (L−1)-th layer, so as to obtain the weight gradient of the L-th layer.

In some embodiments of the present disclosure, when the original weight gradient is updated, the DMA controlling module is configured to pre-prepare the convolution kernel and the convoluted data for the original weight gradient that an inverted convolution calculation is required, by referring to the above formula (1), and then store the convolution kernel and the convoluted data for the original weight gradient in a cache space. It is to determine an original image feature gradient of a first convolution layer (e.g., the L-th layer) as a convolution kernel for an original weight gradient of the first convolution layer; and also to determine an image feature of a second convolution layer (e.g., the (L−1)-th layer) connected to an input end of the first convolution layer as convoluted data for the original weight gradient of the first convolution layer.

Therefore, a processor can be configured to prepare the convolution kernel and the corresponding convoluted data in advance by using the DMA controlling module to directly perform the inverted convolution calculation, rather than screening the convolution kernel and corresponding convoluted data for the original weight gradient from a plurality of convolution parameters, which can improve inverted convolution efficiency and accelerate to update the weight gradient.

Figure 4:
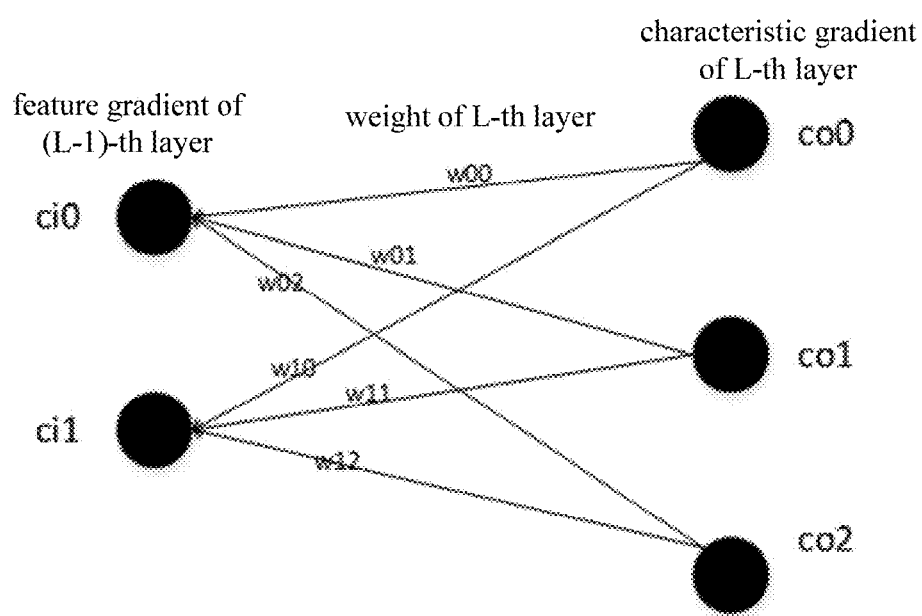
FIG. 4 is a schematic diagram of calculating a feature gradient of an (L−1)-th layer of FIG. 1 in the back propagation process of the neural network convolutional layer.

FIG. 4 is a schematic diagram of calculating a feature gradient of an (L−1)-th layer of FIG. 1 in the back propagation process of the neural network convolutional layer.

Referring to FIG. 4, the feature gradient of the (L−1)-th layer can be calculated as follows.

$$\delta^{l-1} = \delta^l \otimes \text{rot}180(W^l) \qquad \text{formula (2)}$$

Wherein, $\delta^{l-1}$ represents a feature gradient of the (L−1)-th layer, $\delta^l$ represents a feature gradient of the L-th layer, $W^l$ represents a weight of the L-th layer, $\text{rot}180(W^l)$ represents to rotating a weight of the L-th layer with 180 degrees. In this way, data after rotation are used as the convolution kernel to perform the convolution processing on the feature gradient of the L-th layer to obtain the feature gradient of the (L−1)-th layer.

In some embodiments of the present disclosure, when the original image feature gradient is updated, the DMA controlling module is configured to pre-prepare the convolution kernel and the convoluted data for the original image feature gradient that an inverted convolution calculation is required, by referring to the above formula (2), and then store the convolution kernel and the convoluted data for the original image feature gradient in the cache space. It is to perform the inverted processing on a weight of a third convolution layer (for example, the L-th layer), based on the DMA controlling module; and to determine an inverted weight (for example, rot180($W^i$)) of the third convolution layer as a convolution kernel for an original image feature gradient of a fourth convolution layer (for example, the (L−1)-th layer) connected with an input end of the third convolution layer. In addition, the original image feature gradient of the third convolution layer can also be determined as convoluted data for the original image feature gradient of the fourth convolution layer.

Therefore, the processor can be configured to prepare the convolution kernel and the corresponding convoluted data in advance by using the DMA controlling module to directly perform the inverted convolution calculation, rather than screening the convolution kernel and corresponding convoluted data for the original image feature gradient from the plurality of convolution parameters, and also rather than performing the inverted processing for the weight, which can improve inverted convolution efficiency and accelerate to update the weight gradient.

In some embodiments of the present disclosure, the DMA controlling module can include a plurality of special DMA controllers. The convolution parameters is read by invoking a first DMA controller, and the convolution kernel corresponding to each convolution layer is stored in the first cache space; the convolution parameters is also read by invoking a second DMA controller, and the convoluted data corresponding to each convolution layer is stored in a second cache space. Therefore, the convolution kernel and the convoluted data are respectively processed by using different DMA controllers, thereby data conversion and storage efficiency from the convolution parameters into the cache spaces can be improved.

It can be seen that, in an embodiment of the present disclosure, the processor in the mobile terminal can be configured to invoke the DMA controlling module to predetermine the convolution kernel and the convoluted data from the convolution parameters of the convolutional network in the image processing model, and then store the convolution kernel and the convoluted data in different cache spaces, respectively. In this way, The processor can be configured to invoke the convolution kernel and the corresponding convoluted data from the different cache spaces to directly perform the inverted convolution calculation, rather than invoking data and determining the convolution kernel from the memory (such as a hard disk). Therefore, the present disclosure can greatly improve gradient update efficiency, save a training cost and shorten a training time of the image processing model, so that the image processing model can be quickly put into production, for example, an image recognition model can be more quickly used by operators to further speed up an overall time of image recognition applications.

It should be noted that some convolution parameters in the convolution layer of the image processing model can be multidimensional. For example, the original image feature gradient is two-dimensional, which leads to a large amount of inverted convolution calculation.

Figure 5:
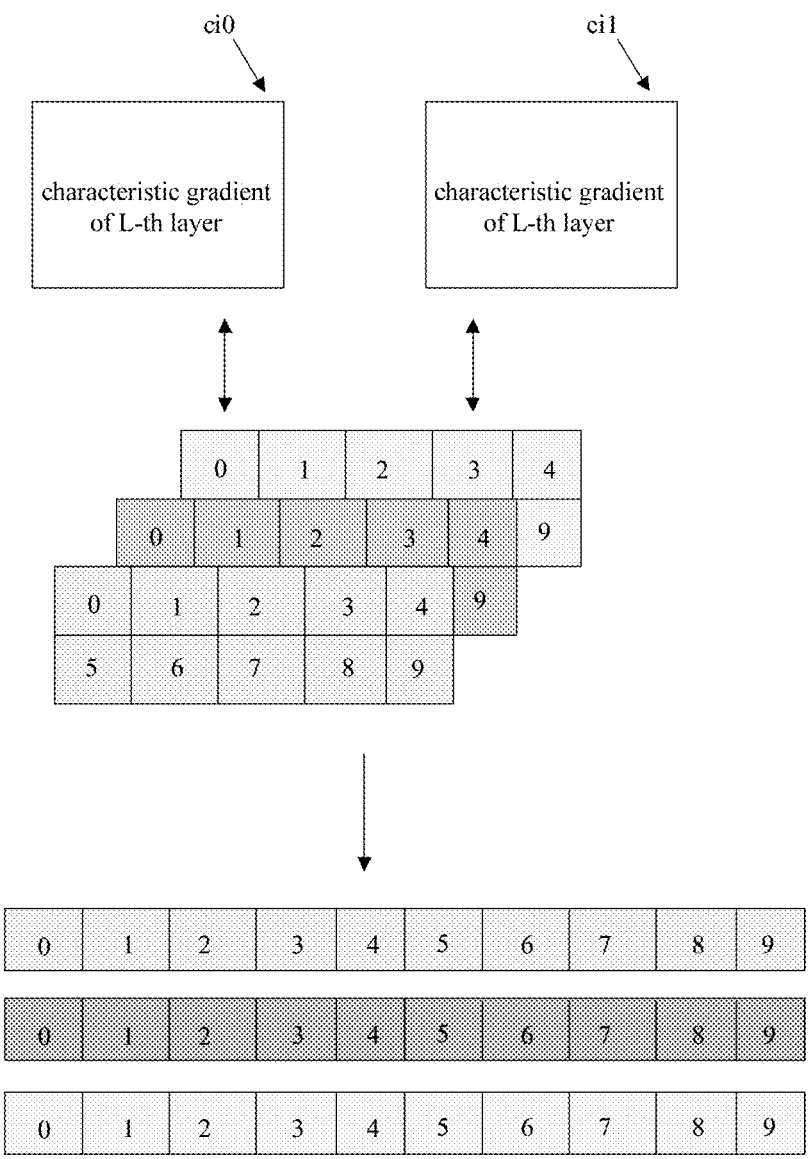
FIG. 5 is a schematic diagram of performing dimensionality reduction processing on convolution parameters that has been obtained in accordance with an embodiment of the present disclosure.

In some embodiments of the present disclosure, when obtained convolution parameters are multi-dimensional data, performing dimensionality reduction processing on the obtained convolution parameters to reduce calculation amount of the inverted convolution. FIG. 5 is a schematic diagram of performing the dimensionality reduction processing on the obtained convolution parameters in accordance with an embodiment of the present disclosure. Referring to FIG. 5, there are three two-dimensional image feature gradients (0~9) in the L-th layer, which can be tiled into three one-dimensional vectors.

Figure 6:
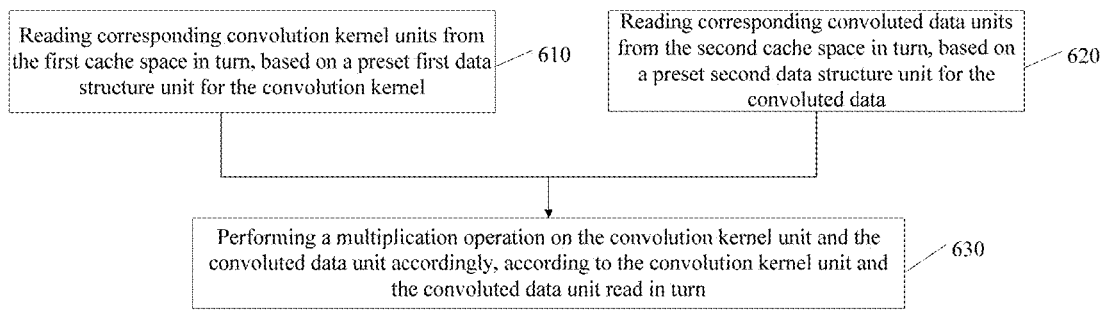
FIG. 6 is a flowchart of performing an inverted convolution calculation by using the convolution parameters in accordance with an embodiment of the present disclosure.

FIG. 6 is a schematic diagram of performing the inverted convolution calculation by using the convolution parameters in accordance with an embodiment of the present disclosure.

Referring to FIG. 6, step 610, reading corresponding convolution kernel units from the first cache space in turn, based on a preset first data structure unit for the convolution kernel.

Step 620, reading corresponding convoluted data units from the second cache space in turn, based on a preset second data structure unit for the convoluted data.

Step 630, performing a multiplication operation on the convolution kernel unit and the convoluted data unit accordingly, according to the convolution kernel unit and the convoluted data unit read in turn.

It should be noted that the first data structure unit and the second data structure unit can be determined according to convolution calculation ability and requirements of the processor. Specifically, a data structure unit can be a matrix with a specific size, it is assumed that a cycle of a certain processor can be calculated by multiplying a 2×3 matrix with a 3×3 matrix, correspondingly, the first data structure unit is the 2×3 matrix, and the second data structure unit is the 3×3 matrix.

In some embodiments of the present disclosure, stored data in the first cache space is obtained by reading the convolution kernel corresponding to each convolution layer based on the first data structure unit; and stored data in the second cache space is obtained by reading the convoluted data corresponding to each convolution layer based on the second data structure unit. That is to say, the data structure units for reading and writing data in the first cache space are consistent, which can avoid data conflict caused by inconsistency of reading and writing data and ensure an effective operation of the inverted convolution calculation.

By the implementation of the present disclosure, the convolution kernel and the convoluted data in different cache spaces can be partitioned into predetermined data structure units, so as to meet requirements of the convolution calculation and effectively perform the convolution calculation.

Figure 7:
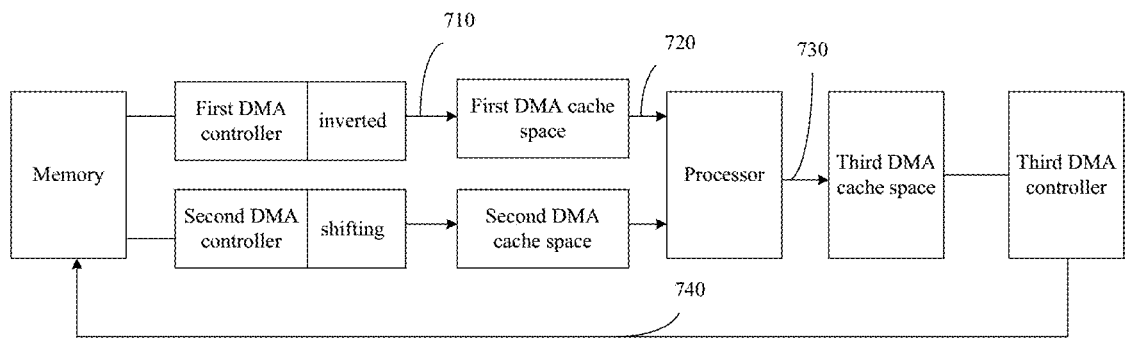
FIG. 7 is an architectural schematic diagram of a system applying for the method for gradient updating of the image processing model in accordance with an embodiment of the present disclosure.

FIG. 7 is an architectural schematic diagram of a system applying for the method in accordance with an embodiment of the present disclosure.

Referring to FIG. 7, a memory is configured to store input data and output data configured for performing the inverted convolution calculation, which include an image feature, a weight, an original image feature gradient and an original weight gradient.

In step 710, the first DMA controller is configured to move the convolution kernel participated in the convolution operation from the memory to the first cache space. When calculating or updating the image feature gradient of the convolutional layer, the first DMA controller can be configured to perform an inverted operation on the weight of each transported convolutional layer (that is, 180 degrees is inverted.), so as to obtain the convolution kernel for updating the image feature gradient, and then, the inverted operation can be omitted during the inverted convolution calculation process, which not only can save resources of the processor, but also can improve the gradient update efficiency. The second DMA controller can be configured to move the convoluted data participated in the convolution operation from the memory to the second cache space. The second DMA controller is configured to compare a convoluted data unit of the convoluted data with a data read-write unit of the second cache space during writing the convoluted data to the second cache space. When the convoluted data unit is larger than the data read-write unit for the second cache space, the second DMA controller is configured to process the convoluted data unit to reduce a bandwidth transmission pressure between the memory and the second cache space, more details are described s in conjunction with FIG. 9 below.

Step 720, after both the convolution kernel and the convoluted data are stored in the cache, the processor is started for performing multiplication and accumulation (or matrix multiplication and accumulation) operations.

Step 730, after the calculation above is completed, calculation results can be stored in a third cache space.

Step 740, after the data is stored in the third cache space, the calculation results (or a weight gradient or an image feature gradient that has been updated) can be stored back into the memory through a third DMA controller.

Referring to FIG. 2 and FIG. 3, details of updating the weight gradient of the convolution layer (for example, the L-th layer) can be provided below according to an embodiment of the present disclosure.

Figure 8:
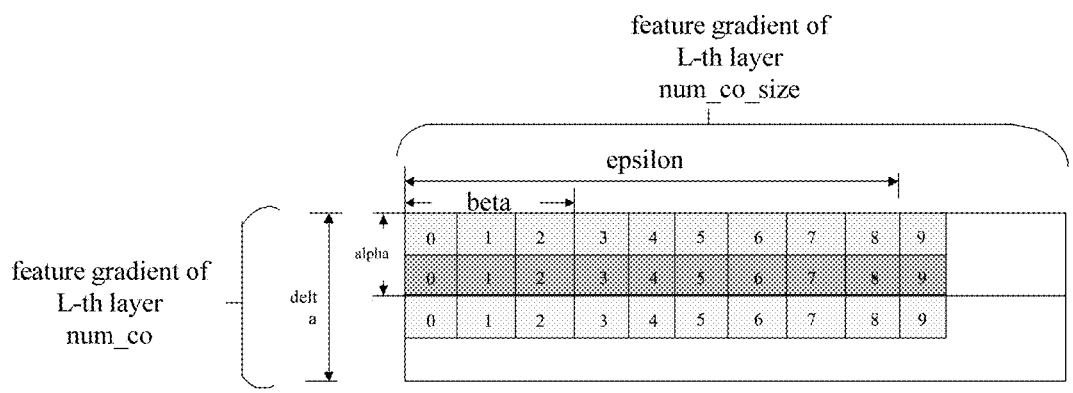
FIG. 8 is a schematic diagram of moving the convolution kernel used to calculate the weight gradient of the L-th layer to a first cache space in accordance with an embodiment of the present disclosure.

FIG. 8 is a schematic diagram of moving the convolution kernel used to calculate the weight gradient of the L-th layer to the first cache space in accordance with an embodiment of the present disclosure.

Referring to FIG. 8, when calculating the weight gradient of the L-th layer, three two-dimensional image feature gradients of the L-th layer are used as corresponding convolution kernels, and tiled into three one-dimensional vectors, and then, the three one-dimensional vectors are moved to the first cache space by the first DMA controller, according to the data structure shown in FIG. 8. It is assumed that a cycle of the processor can be calculated by multiplying a 2×3 matrix (that is, a data structure unit of the convolution kernel) with a 3×3 matrix (that is, a data structure unit of the convoluted data), for example, in the data structure unit of the convolution kernel of FIG. 8, a number of matrix rows alpha=2, and a number of matrix columns beta=3. Furthermore, delta represents a number of times that needs to be repeatedly calculated in a matrix row direction of the first cache space (that is, a matrix multiplication calculation), and epsilon represents a number of times that need to be repeatedly calculated in a column direction of the first cache space. Delta and epsilon are determined by the size of the first cache space (shorten for wbuf size) to ensure delta*alpha*beta*epsilon<wbuf size. It should be noted that, it is temporarily assumed that the first cache space can be configured to store all data that need to be involved in the gradient calculation. In the following sections, it is to describe how to perform the gradient calculation when the data involved in the inverted convolution operation exceeds the wbuf size.

The convoluted data (for example, a matrix) includes a plurality of convoluted data units (for example, row data in a matrix), when reading the convoluted data and then writing the convoluted data to the second cache space, a same convoluted data unit can be repeatedly appeared in different locations of the cache space, which increases demands for data transmission bandwidths between the memory and the cache space.

Figure 9:
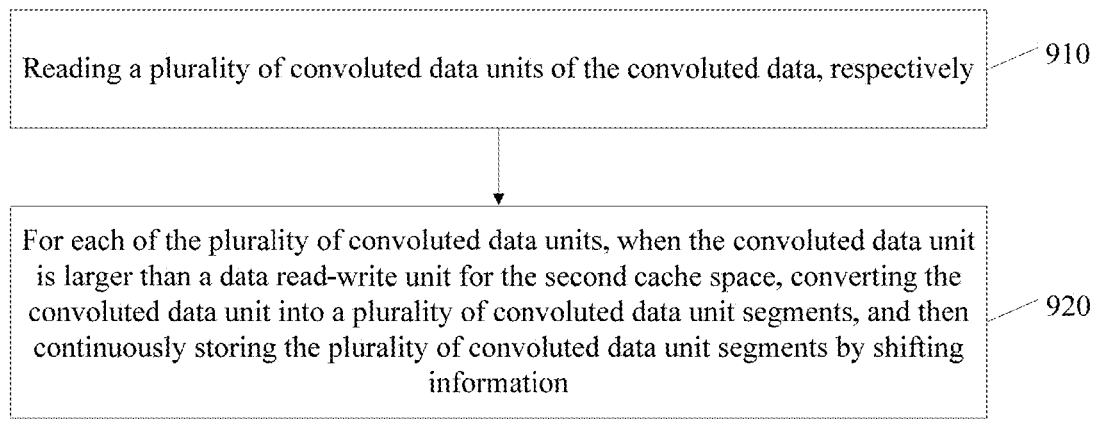
FIG. 9 is a flowchart of storing the convoluted data to a second cache space in accordance with an embodiment of the present disclosure.

FIG. 9 is a flowchart of storing the convoluted data to the second cache space in accordance with an embodiment of the present disclosure.

Referring to FIG. 9, step 910, reading a plurality of convoluted data units of the convoluted data, respectively.

Step 920, for each of the plurality of convoluted data units, when the convoluted data unit is larger than a data read-write unit for the second cache space, converting the convoluted data unit into a plurality of convoluted data unit segments, and then continuously storing the plurality of convoluted data unit segments by shifting information. A size of each convoluted data unit segment matched with a size of the data read-write unit.

The data read-write unit can represent a data size in a single read-write operation for the cache space. For example, 5 data points can be read at a time, and the convoluted data unit can be used to represent a complete convoluted information segment, such as a complete row of data in a matrix. When the convoluted data unit exceeds the data read-write unit (for example, 5 data points), the convoluted data unit can be converted into corresponding convoluted data unit segments, and a size of the convoluted data unit segment is matched with the data read-write unit. Furthermore, a sum value of the data size of each data read-write unit can exceed the size of the convoluted data unit, in this way, information can be reused between different convoluted data unit segments. The plurality of convoluted data unit segments is continuously stored by the shifting information to ensure continuity and integrity of the convoluted data.

In some embodiments of the present disclosure, the data size of the data read-write unit can also be configured to meet requirements of various application scenarios based on system configuration information (or user's requirements).

In an embodiment of the present disclosure, the shifting information can be used to represent information that exceeds the data read-write unit, so as to ensure continuity of storage locations of the convoluted information in the cache space, which can greatly reduce the data bandwidth pressure.

Figure 10:
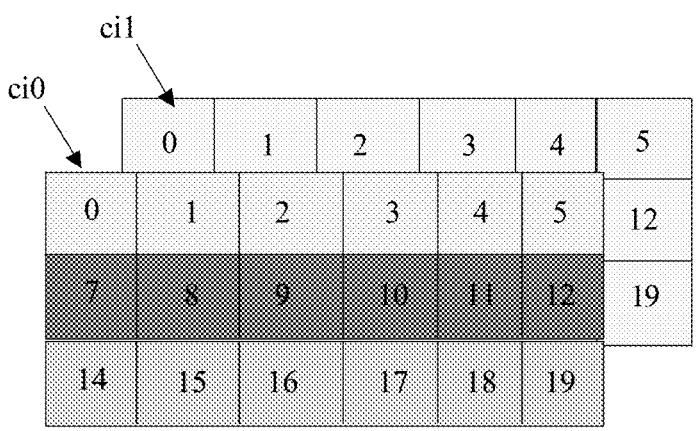
FIG. 10 is a schematic diagram of a data structure of the convoluted data used to calculate the weight gradient of the L-th layer in accordance with an embodiment of the present disclosure.

FIG. 10 is a schematic diagram of a data structure of the convoluted data used to calculate the weight gradient of the L-th layer in accordance with an embodiment of the present disclosure.

Figure 11:
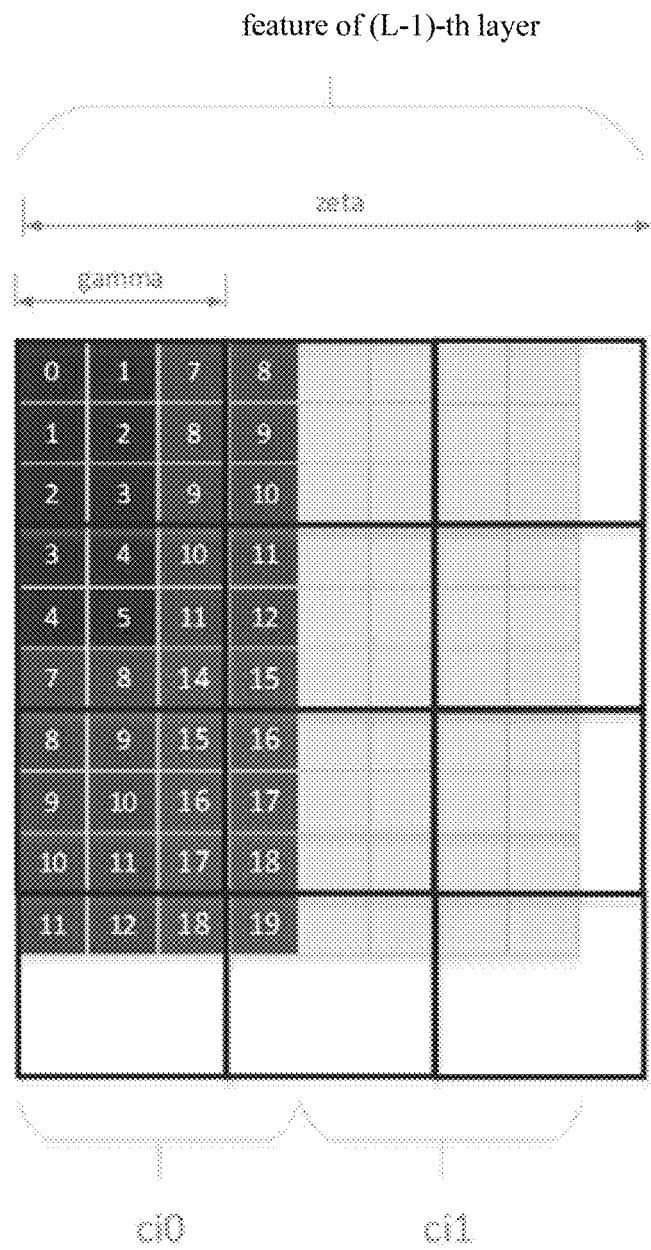
FIG. 11 is a schematic diagram of a data storage way of storing data of FIG. 10 to the second cache space in accordance with an embodiment of the present disclosure.

Referring to FIG. 10, the convoluted data used to calculate the weight gradient of the L-th layer is the image feature of the (L−1)-th layer, with a pair of 3×6 two-dimensional matrices, and the image feature is needed to be stored in the second cache space as shown in FIG. 11.

As can be seen from the storage structure of FIG. 11, different rows of data in a two-dimensional matrix can be repeatedly appeared in different locations, and even the data in the same row can be stored in different locations of the second cache space, which results in increasing burden of the data transmission bandwidth from the memory to the second cache space.

As seen in FIG. 11, although the same data is appeared in different locations, it is stored according to a certain rule. The data reused in the same row of the second cache space is shifted data (data shifted or address shifted), so that it only needs to add a shift or a bias for storing the shifted data or an address.

FIG. 12 is a schematic diagram of writing the feature of the (L−1)-th layer shown in FIG. 10 to the second cache space in accordance with an embodiment of the present disclosure.

Referring to FIG. 12, firstly, the second DMA controller is configured to read a first row of data 0~5 once, and five consecutive data 0~4 are taken and then placed in a first column. And then, shifting one data, another five consecutive data 1~5 are taken and placed in a second column, such offset can be achieved by a shifting module within the second DMA controller.

Secondly, the second DMA controller is configured to read a second row of data 7~12 once, and five consecutive data 7~11 are taken and then stored in the first column following the first row, and then shifting one data, five consecutive data 8~12 are taken and placed in the second column located in the back of the first row of data.

When data is read and written to the cache space, it can be known where the data needs to be placed consecutively (for example, in a third column and a fourth column) until the row of data is completely stored, based on information of the shifting module (that is, shift information). It should be noted that each row of data that is stored is also determined by the shifting module of the second DMA controller based on the information given by the system.

Finally, a third row of data 14~19 can be read, and five consecutive data 14~18 are taken and then placed in a third column following the second row, and then shifting one data, five consecutive data 15~19 are taken and placed in a fourth column located in the back of the second row of data. In this way, a number of consecutive data taken at a time is also calculated based on the information given by the system. According to embodiments of the present disclosure, the data bandwidth pressure of the memory can be greatly reduced.

In some embodiments of the present disclosure, when the convolution kernel and the convoluted data are ready in the first cache space and the second cache space, the processor can be started to perform a matrix multiplication. In the process of the matrix calculation, alpha*beta data in the first cache space (that is, a matrix unit corresponding to the convolution kernel) and beta*gamma data in the second cache space (that is, a matrix unit corresponding to the convoluted data) can be read at a time to perform the matrix multiplication. After epsilon accumulations are performed, the data is stored in the third cache space.

Figure 13:
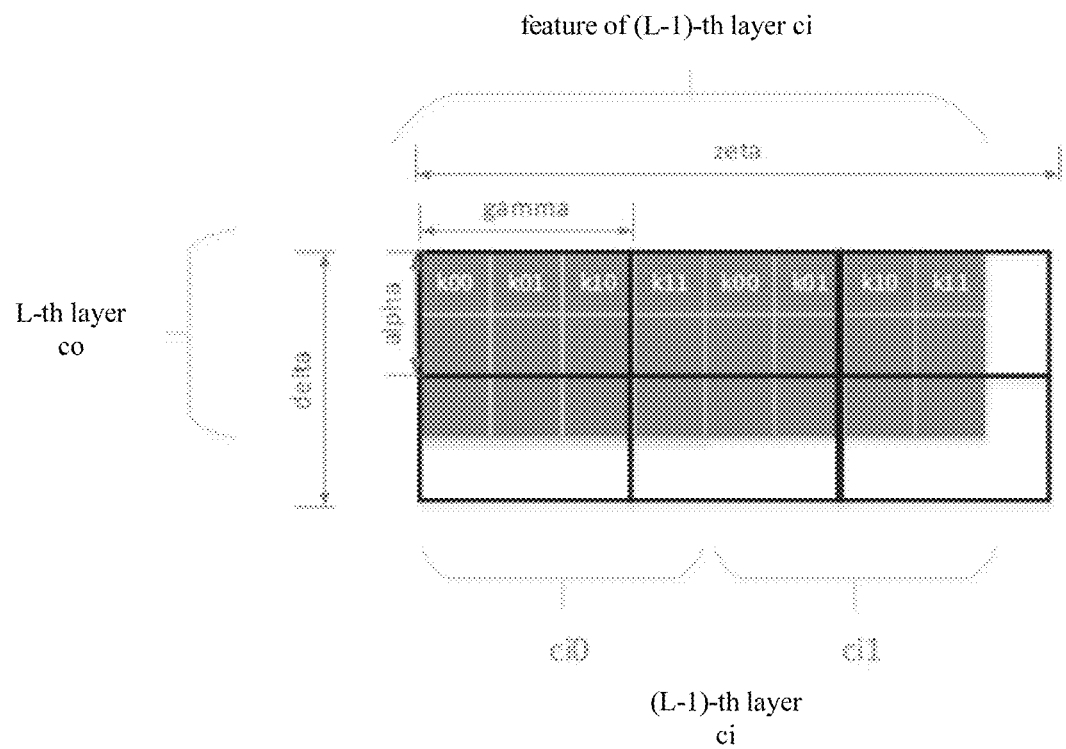
FIG. 13 is a schematic diagram of calculation results of the weight gradient of the L-th layer in accordance with an embodiment of the present disclosure.

FIG. 13 is a schematic diagram of results of calculating the weight gradient of the L-th layer in accordance with an embodiment of the present disclosure.

Referring to FIG. 13, when the data of the first cache space and the second cache space has been performed the calculations, a result with 3 rows and 8 columns (i.e. 3×2×2×2 weight gradients) is obtained, wherein a first 3 represents a number of output image feature of the L-th layer, a second 2 represents a number of the output image feature of the (L−1)-th layer, and the following 2×2 respectively represent a size of each weight. In FIG. 13, each row represents the weight gradient between the image feature of the L-th layer and the image feature of the (L−1)-th layer.

Figure 14:
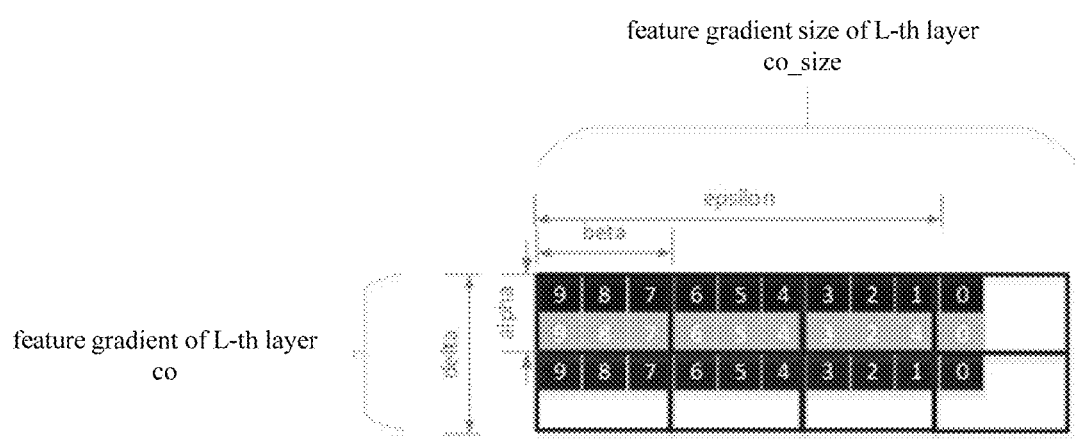
FIG. 14 is a schematic diagram of storing the convolution kernel for updating the feature gradient of the (L−1)-th layer to the first cache space in accordance with an embodiment of the present disclosure.

It should be understood that a process of updating the feature gradient of the (L−1)-th layer is similar to the above process mentioned, a difference is that the first DMA controller is needed to perform the inverted operation on the weight by 180 degrees, that is, the weight is stored in the first cache space according to a format of FIG. 14, for performing subsequent convolution calculation operations.

In some application scenarios, the size of the convolution kernel or the convoluted data in the convolution layer of the image processing model is too large, so that the convolution kernel and convolution sub-data of the neural network can't be directly stored in corresponding cache spaces.

Figure 15:
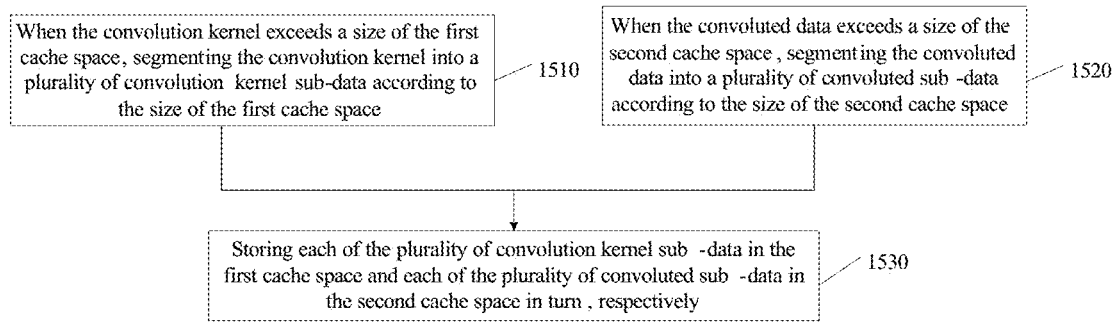
FIG. 15 is a flowchart of storing the convolution kernel and convolution sub-data to a cache space in accordance with an embodiment of the present disclosure.

FIG. 15 is a flowchart of storing the convolution kernel and the convolution sub-data to the cache space in accordance with an embodiment of the present disclosure.

Referring to FIG. 15, step 1510, when the convolution kernel exceeds a size of the first cache space, segmenting the convolution kernel into a plurality of convolution kernel sub-data according to the size of the first cache space.

Step 1520, when the convoluted data exceeds a size of the second cache space, segmenting the convoluted data into a plurality of convoluted sub-data according to the size of the second cache space.

Step 1530, storing each of the plurality of convolution kernel sub-data and each of the plurality of convoluted sub-data in the first cache space and the second cache space, respectively.

In an embodiment of the present disclosure, the convolution kernel and the convoluted data are partitioned according to corresponding cache spaces, respectively, so that the inverted convolution calculation process can be applied to image processing models with various sizes, which has a wide range of applications.

Figure 16:
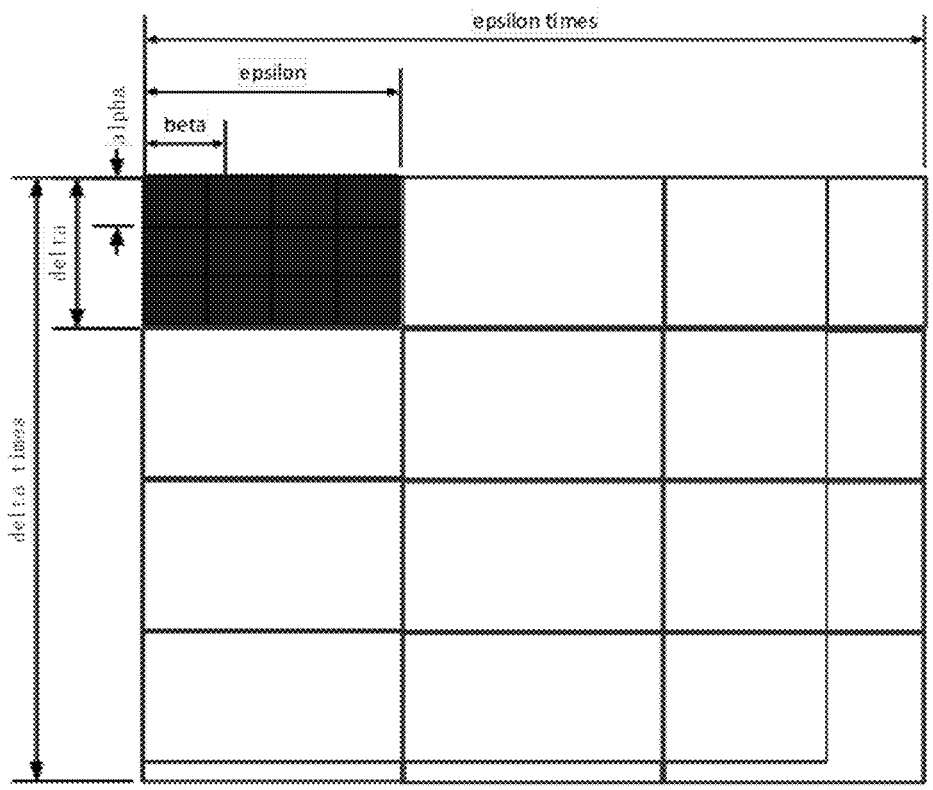
FIG. 16 is a schematic diagram of partitioning the convolution kernel of the first cache space in accordance with an embodiment of the present disclosure.
Figure 17:
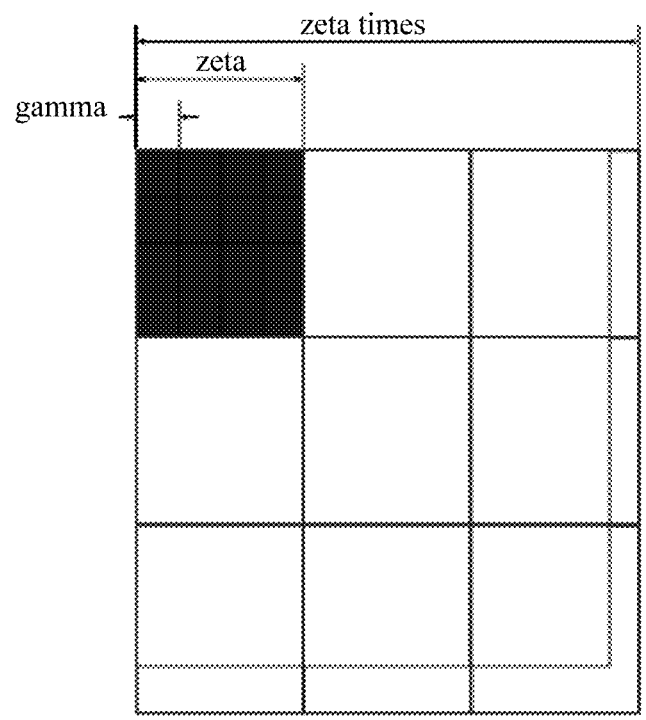
FIG. 17 is a schematic diagram of partitioning the convoluted data of the second cache space in accordance with an embodiment of the present disclosure.

FIG. 16 is a schematic diagram of partitioning the convolution kernel of the first cache space in accordance with an embodiment of the present disclosure. FIG. 17 is a schematic diagram of partitioning the convoluted data of the second cache space in accordance with an embodiment of the present disclosure.

Referring to FIG. 16, if the convolution kernel exceeds the size of the first cache space, the convolution kernel can be segmented according to the size of the first cache space, so that each convolution kernel sub-data that has been segmented can be stored in the first cache space. Referring to FIG. 17, if the convoluted data exceeds the size of the second cache space, the convoluted data can be segmented according to the size of the second cache space, so that each convoluted sub-data that has been segmented can be stored in the second cache space, and then the processor is invoked to perform corresponding matrix calculation operations. Zeta times can represent a number of times that data in the second cache space along a column direction thereof needs to be repeatedly calculated.

In some embodiments of the present disclosure, when it is detected that repeated calculation operations in different data directions have been completed for delta times, epsilon times and zeta times, respectively, it is configured to perform the convolution operation on a super-large matrix and a super-large matrix so as to obtain the updated gradient.

Figure 18:
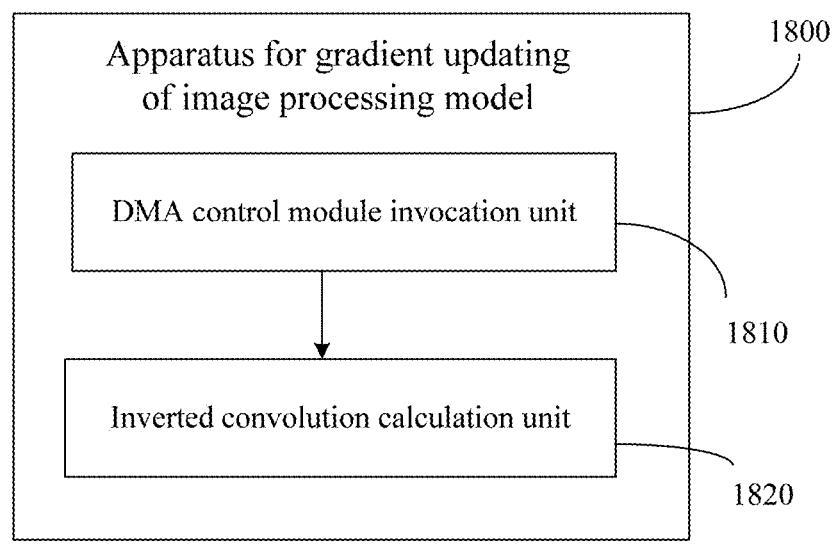
FIG. 18 is a schematic diagram of an apparatus for gradient updating of an image processing model in accordance with an embodiment of the present disclosure.

FIG. 18 is a schematic diagram of an apparatus for gradient updating of an image processing model in accordance with an embodiment of the present disclosure. Referring to FIG. 18, the apparatus 1800 includes a DMA controlling module invocation unit 1810 and an inverted convolution calculation unit 1820.

The DMA controlling module invocation unit 1810 is configured to invoke a DMA controlling module, and determine a convolution kernel and convoluted data corresponding to each convolution layer according to convolution parameters of each convolution layer in the image processing model, store the convolution kernel corresponding to each convolution layer into a first cache space and the convoluted data corresponding to each convolution layer into a second cache space, respectively. The convolution parameters include an image feature, a weight, an original image feature gradient and an original weight gradient, and the convolution kernel includes a convolution kernel for the original image feature gradient and a convolution kernel for the original weight gradient.

The inverted convolution calculation unit 1820 is configured to perform an inverted convolution calculation based on the convolution kernel in the first cache space and the convoluted data in the second cache space to update the original feature gradient and the original weight gradient of each convolution layer.

It should be noted that information interaction and execution processes between the above devices/units are based on the same conception as the embodiments of the present disclosure, therefore, specific functions and technical effects brought by the above devices/units can be detailed in the embodiments of the present method, which will not be repeated here.

Figure 19:
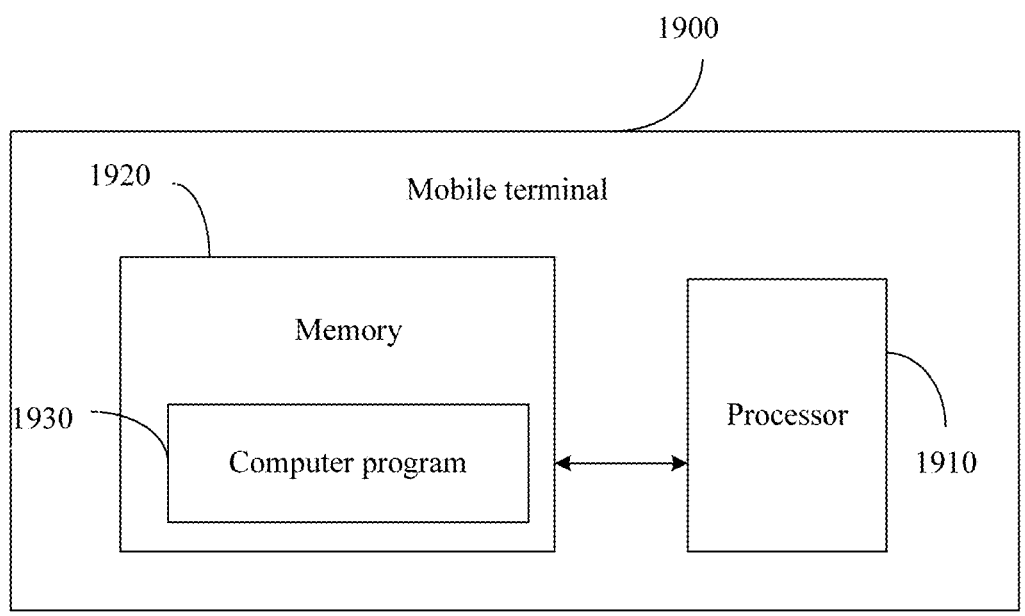
FIG. 19 is a schematic diagram of a mobile terminal in accordance with an embodiment of the present disclosure.

FIG. 19 is a schematic diagram of a mobile terminal in accordance with an embodiment of the present disclosure. Referring to FIG. 19, the mobile terminal 1900 includes: a processor 1910, a memory 1920 and computer programs 1930 stored in the memory 1920 and performed by the processor 1910 to implement steps of the method for gradient updating of the image processing model mentioned above, such as steps 210-230 shown in FIG. 2. Or, the processor 1910 is configured to perform the computer programs 1930 to implement functions of the modules/units of the embodiments described in the gradient updating apparatus mentioned above, such as the functions of the units 1810-1830 shown in FIG. 8.

Specifically, the computer program 1930 can be segmented into one or more modules/units that are stored in the memory 1920 and performed by the processor 1910 to implement the present disclosure. The one or more modules/units can be a series of computer program instruction segments capable of performing specific functions, which are configured to describe execution of the computer programs 1930 in the mobile terminal 1900. For example, the computer programs 1930 can be segmented to the DMA controlling module invocation unit and the inverted convolution calculation unit, and specific functions of each of the DMA controlling module invocation unit and the inverted convolution calculation unit are as follows:

The DMA controlling module invocation unit is configured to invoke a DMA controlling module, and determine a convolution kernel and convoluted data corresponding to each convolution layer according to convolution parameters of each convolution layer in the image processing model, store the convolution kernel corresponding to each convolution layer into a first cache space and the convoluted data corresponding to each convolution layer into a second cache space, respectively. The convolution parameters include an image feature, a weight, an original image feature gradient and an original weight gradient, and the convolution kernel includes a convolution kernel for the original image feature gradient and a convolution kernel for the original weight gradient.

The inverted convolution calculation unit is configured to perform an inverted convolution calculation based on the convolution kernel in the first cache space and the convoluted data in the second cache space to update the original feature gradient and the original weight gradient of each convolution layer.

The mobile terminal 1900 can be a computing device such as a desktop computer, a notebook, a handheld computer and a cloud server. The mobile terminal 1900 can include, but is not limited to, a processor 1910 and a memory 1920. An ordinary skilled person in the art can be understood that: FIG. 9 is only an example of the mobile terminal 1900, but is not limited to the mobile terminal 1900 which can include more or less components than FIG. 9, or some combination of components, or different components. For example, the mobile terminal 1900 can also include input/output devices, network access devices, buses, etc.

The processor 1910 can be a Central Processing Unit (CPU), other general-purpose processors, a Digital Signal Processor (DSP), an Application Specific Integrated Circuit (ASIC), a Field-Programmable Gate Array (FPGA) or other programmable logic devices, discrete gates or transistor logic devices, discrete hardware components, etc. The general-purpose processor can be a microprocessor or any conventional processors, etc.

The memory 1920 can be an internal storage unit within the mobile terminal 1900, such as a hard disk or a memory of the mobile terminal 1900. The memory 1920 can also be an external storage device of the mobile terminal 1900, such as a plug-in hard disk, a Smart Media Card (SMC), a Secure Digital (SD) Card, and a Flash Card, etc. equipped on the mobile terminal 1900. Furthermore, the memory 1920 can also include both an internal storage unit of the mobile terminal 1900 and an external storage device. The memory 1920 is configured to store computer programs and other programs and data required by the mobile terminal 1900, and temporarily store data that has been output or to be output.

An ordinary skilled person in the art can be clearly understood that: for convenient and simple description, the above functional units and modules are only divided to illustrate with examples. In a practical application, different functional units and modules can be assigned to implement the above functions according to needs, that is, internal structures of the apparatus can be divided into different functional units or modules to complete all or part of the functions described above. Each functional unit or each module in embodiments of the present disclosure can be integrated in a processing unit, or each unit can be physically existed separately, or two or more units can be integrated in a unit. The above-mentioned integrated units can be realized in the form of hardware or software functional units. In addition, specific names of each functional unit and each module are only to conveniently distinguish with each other, but are not limited to the protection scope of the present disclosure. A specific working process of the units and modules in the above system can be referred to the corresponding process in the embodiment of the above method.

In the above embodiments, the description of each embodiment has its own emphasis, and parts without detailed description in one embodiment can be referred to relevant description of other embodiments.

An ordinary skilled person in the art can be aware that various illustrative units and algorithm steps described in connection with the embodiments disclosed herein can be implemented as electronic hardware or combinations of computer software and electronic hardware. Whether these functions are performed in hardware or software modes depends on a specific application of the technical solution and design constraints. Professionals can use different methods for each specific application to achieve the functions described, but such implementation should not be considered outside the scope of this application.

It should be understood that the disclosed apparatus/terminal and method in the embodiments provided by the present disclosure can be implemented in other ways. For example, the embodiments of the apparatus/terminal described above are merely schematic; for example, the division of the modules or units is merely a division of logical functions, which can also be realized in other ways; for example, multiple units or components can combined or integrated into another system, or some features can be ignored or not implemented. On the other hand, the coupling, direct coupling or communication connection shown or discussed may be achieved through some interfaces, indirect coupling or communication connection between devices or units may electrical or otherwise.

The units described as separation parts can or can't be physically separated, and the parts displayed as modules can or can't be physical units, that is, they can be located in one place, or can be distributed on a plurality of network units. Some or all of the units can be selected according to actual needs to implement the purpose of the present disclosure.

In addition, each functional unit in each embodiment of the present disclosure can be integrated in a processing unit, or each unit can be separately formed with a physical form, or two or more units can be integrated in one unit. The above integrated units can be implemented either in a hardware form or in the form of hardware plus software function modules.

The integrated modules/units can be stored in a computer readable memory if implemented in the form of software program modules and sold or used as a separate product. Based on this understanding, all or part of the steps in the method of the above embodiment in the present disclosure can be implemented by computer program instructions of relevant hardware which can be stored in a computer readable storage medium, the computer program can be performed by the processor to implement the steps in the various methods of the above embodiments. Furthermore, the computer program includes computer program codes, which can be in a form of source codes, object codes, executable files or some intermediate forms, etc. The computer readable medium can include: any entities or devices capable of carrying the computer program codes, a recording medium, a U disk, a mobile hard disk drive, a diskette or a CD-ROM, a computer Memory, a Read-Only Memory (ROM), a Random Access Memory (RAM), an electrical carrier signal, a telecommunication signal and a software distribution medium, etc. It should be noted that content contained in the computer readable storage medium can be added or reduced as appropriate to the requirements of legislation and patent practice within the jurisdictions, for example, in some jurisdictions, in accordance with legislation and patent practice, computer readable storage medium do not include electrical carrier signals and telecommunications signals.

The above embodiments are used only to describe, but not limited to, the technical solution of the present disclosure. Although the features and elements of the present disclosure are described as embodiments in particular combinations, an ordinary skilled person in the art should understand that: each feature or element can be used alone or in other various combinations within the principles of the present disclosure to the full extent indicated by the broad general meaning of the terms in which the appended claims are expressed. Any variation or replacement made by one of ordinary skill in the art without departing from the spirit of the present disclosure shall fall within the protection scope of the present disclosure.

What is claimed is:

1. A method for gradient updating of an image processing model comprising:
    determining a convolution kernel and convoluted data corresponding to each convolution layer, according to convolution parameters of each convolution layer in the image processing model, by invoking a direct memory access (DMA) controlling module; storing the convolution kernel corresponding to each convolution layer into a first cache space, and storing the convoluted data corresponding to each convolution layer into a second cache space; wherein the convolution parameters comprise an image feature, a weight, an original image feature gradient and an original weight gradient, and the convolution kernel comprises a convolution kernel for the original image feature gradient and a convolution kernel for the original weight gradient; and
    performing an inverted convolution calculation based on the convolution kernel in the first cache space and the convoluted data in the second cache space to update the original feature gradient and the original weight gradient of each convolution layer.

2. The method as claimed in claim 1, wherein the step of determining a convolution kernel and convoluted data corresponding to each convolution layer according to convolution parameters of each convolution layer in an image processing model further comprises:
    determining an original image feature gradient of a first convolution layer as a convolution kernel for an original weight gradient of the first convolution layer; and
    determining an image feature of a second convolution layer connected to an input end of the first convolution layer as convoluted data for the original weight gradient of the first convolution layer.

3. The method as claimed in claim 1, wherein the step of determining a convolution kernel and convoluted data respectively corresponding to each convolution layer according to convolution parameters of each convolution layer in an image processing model further comprises:
    performing inverted processing on a weight of a third convolution layer, based on the DMA controlling module;
    determining the weight of the third convolution layer that has been performed the inverted processing as a convolution kernel for an original image feature gradient of a fourth convolution layer connected with an input end of the third convolution layer; and
    determining an original image feature gradient of the third convolution layer as convoluted data for the original image feature gradient of the fourth convolution layer.

4. The method as claimed in claim 1, wherein the step of performing an inverted convolution calculation based on the convolution kernel in the first cache space and the convoluted data in the second cache space, comprises:
    reading corresponding convolution kernel units from the first cache space in turn, based on a preset first data structure unit for the convolution kernel;
    reading corresponding convoluted data units from the second cache space in turn, based on a preset second data structure unit for the convoluted data; and
    performing a multiplication operation on the convolution kernel unit and the convoluted data unit accordingly, according to the convolution kernel unit and the convoluted data unit read in turn.

5. The method as claimed in claim 4, wherein stored data in the first cache space is obtained by reading the convolution kernel corresponding to each convolution layer based on the first data structure unit; and stored data in the second cache space is obtained by reading the convoluted data corresponding to each convolution layer based on the second data structure unit.

6. The method as claimed in claim 1, wherein the convoluted data comprises a plurality of convoluted data units, the step of storing the convolution kernel corresponding to each convolution layer into the first cache space and the convoluted data corresponding to each convolution layer into the second cache space, further comprises:
    reading the plurality of convoluted data units of the convoluted data, respectively;
    for each of the plurality of convoluted data units, when the convoluted data unit is larger than a data read-write unit for the second cache space, converting the convoluted data unit into a plurality of convoluted data unit segments, and then continuously storing the plurality of convoluted data unit segments by shifting information; a size of each convoluted data unit segment matched with a size of the data read-write unit.

7. The method as claimed in claim 1, wherein the step of storing the convolution kernel corresponding to each convolution layer into the first cache space and the convoluted data corresponding to each convolution layer into the second cache space, further comprises:
    when the convolution kernel exceeds a size of the first cache space, segmenting the convolution kernel into a plurality of convolution kernel sub-data according to the size of the first cache space; and
    when the convoluted data exceeds a size of the second cache space, segmenting the convoluted data into a plurality of convoluted sub-data according to the size of the second cache space;
    storing each of the plurality of convolution kernel sub-data in the first cache space and each of the plurality of convoluted sub-data in the second cache space in turn, respectively.

8. The method as claimed in claim 1, wherein the DMA controlling module comprises a first DMA controller and a second DMA controller, and the step of storing the convolution kernel corresponding to each convolution layer into the first cache space and the convoluted data corresponding to each convolution layer into the second cache space, respectively, further comprises:
    storing the convolution kernel corresponding to each convolution layer into the first cache space by invoking the first DMA controller; and
    storing the convoluted data corresponding to each convolution layer into the second cache space by invoking the second DMA controller.

9. The method as claimed in claim 8, wherein the step of determining a convolution kernel and convoluted data corresponding to each convolution layer according to obtained convolution parameters by invoking the DMA controlling module, further comprises:
    performing the inverted processing on a weight of each convolution layer that has been obtained by invoking the first DMA controller, so as to obtain the convolution kernel for the original image feature gradient.

10. The method as claimed in claim 8, wherein the step of determining a convolution kernel and convoluted data corresponding to each convolution layer according to obtained convolution parameters by invoking the DMA controlling module, further comprises:

reading the plurality of convoluted data units of the convoluted data by invoking the second DMA controller;
    for each of the plurality of convoluted data units, when the convoluted data unit is larger than a data read-write unit for the second cache space, converting the convoluted data unit into a plurality of convoluted data unit segments, and then continuously storing the plurality of convoluted data unit segments by shifting information, by invoking the second DMA controller; a size of each convoluted data unit segment matched with a size of the data read-write unit.

11. An apparatus for gradient updating of an image processing model comprising:
    a DMA controlling module invocation unit configured to invoke a DMA controlling module and determine a convolution kernel and convoluted data corresponding to each convolution layer, according to convolution parameters of each convolution layer in the image processing model, store the convolution kernel corresponding to each convolution layer into a first cache space and the convoluted data corresponding to each convolution layer into a second cache space, respectively; wherein the convolution parameters comprise an image feature, a weight, an original image feature gradient and an original weight gradient, and the convolution kernel comprises a convolution kernel for the original image feature gradient and a convolution kernel for the original weight gradient;
    an inverted convolution calculation unit configured to perform an inverted convolution calculation based on the convolution kernel in the first cache space and the convoluted data in the second cache space to update the image original feature gradient and the original weight gradient of each convolution layer.

12. A system for gradient updating of an image processing model comprising:
    a first DMA controller configured to determine a convolution kernel corresponding to each convolution layer, according to convolution parameters of each convolution layer in the image processing model, and store the convolution kernel corresponding to each convolution layer into a first cache space;
    a second DMA controller configured to determine convoluted data corresponding to each convolution layer according to the convolution parameters of each convolution layer in the image processing model, and store the convoluted data corresponding to each convolution layer into a second cache space; and
    a processor configured to perform an inverted convolution calculation based on the convolution kernel in the first cache space and the convoluted data in the second cache space to update an original image feature gradient and an original weight gradient of each convolution layer.

* * * * *